United States Patent
Tazartes et al.

(12)

(10) Patent No.: US 6,266,583 B1
(45) Date of Patent: Jul. 24, 2001

(54) SYSTEM AND METHOD FOR IMPROVING THE ACCURACY OF PRESSURE ALTITUDE DETERMINATIONS IN AN INERTIAL NAVIGATION SYSTEM

(75) Inventors: Daniel A. Tazartes, West Hills; Brian T. Lottman, Moorpark; Dean E. Lottman, Chatsworth; John G. Mark, Pasadena, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/539,268

(22) Filed: Mar. 30, 2000

(51) Int. Cl.[7] .................................................. G02B 23/10
(52) U.S. Cl. .................. 701/4; 701/10; 701/14; 342/38; 340/970; 73/384
(58) Field of Search ............................. 701/4, 5, 10, 14, 701/207; 342/38; 340/970; 73/384, 179, 30.01, 30.04, 387

(56) References Cited

U.S. PATENT DOCUMENTS

| 4,882,697 | 11/1989 | Ross | 701/221 |
| 5,671,162 | * 9/1997 | Werbin | 702/139 |

\* cited by examiner

*Primary Examiner*—William A. Cuchlinski, Jr.
*Assistant Examiner*—Arthur D. Donnelly
(74) *Attorney, Agent, or Firm*—Price and Gess

(57) ABSTRACT

A system and method for improving the accuracy of altitude determinations in an inertial navigation system. Pressure measurements available to the inertial navigation system are used to initially calculate an estimated pressure altitude using the standard day model for the atmosphere. Temperature measurements are further utilized in the physical relationship between temperature, pressure, and altitude to compute a second computed altitude. A change between subsequent second computed altitudes is calculated and compared with a respective change in the computed pressure altitude in order to generate a correction value. The correction value is then used to modify the computed pressure altitude to generate a more accurate determination of the absolute altitude of the inertial navigation system. The correction value is utilized to account for changes in atmospheric conditions which may be encountered by an aircraft and to further reduce the effects of erroneous temperature and pressure measurements in subsequent altitude determinations. Thus, the system and method of the present invention provides an absolute altitude determination having improved stability and improved accuracy over prior systems.

24 Claims, 3 Drawing Sheets

SYSTEM AND METHOD FOR IMPROVING THE ACCURACY OF PRESSURE ALTITUDE DETERMINATIONS IN AN INERTIAL NAVIGATION SYSTEM

BACKGROUND OF THE INVENTION

1. Field of the Invention

The present invention relates generally to inertial navigation systems, and specifically to a system and method for improving the accuracy of pressure altitude determinations in an inertial navigation system.

2. Description of Related Art

Inertial navigation systems in aircrafts have typically employed a accelerometers to provide position information to a navigation computer. It is well known that the vertical position (altitude) of the aircraft can be determined from a measured acceleration in the vertical direction by performing a double time integration of the measured vertical acceleration.

The double integration of acceleration in the vertical direction is unstable as acceleration bias can lead to exponential growth in the computed altitude, causing the estimated altitude calculation to have unbounded error due to several factors. First, any vertical acceleration measurement errors from the accelerometers are directly integrated in subsequent calculations to cause both vertical velocity and vertical position error. Second, in order to obtain the actual value for vertical acceleration from the measurement taken by the accelerometer, the effects of gravity must be subtracted from the vertical acceleration measurement. Erroneous acceleration measurements will cause incorrect values for gravity to be subtracted from the measured acceleration, which further compounds the error in the altitude determination causing an even faster growth in the altitude error. Thus, inertial navigation systems relying upon the integration of acceleration measurements to obtain an estimation of altitude are unstable systems.

To provide a more stable inertial navigation system, external references have been used either alone or in combination with inertial measurements to compute estimations of altitude. For instance, a barometric altimeter is a well known device for providing altitude information as a function of the value of barometric pressure based on the direct relationship between pressure and altitude. Barometric altitude, also known as pressure altitude, is determined as a function of pressure based on the standard day model for the atmosphere:

$$S = \begin{cases} K_3 - K_4 \log(P): & P < P_B \\ K_1 \left[1 - \left(\frac{P}{P_0}\right)^{K_2}\right]: & P > P_B \end{cases}$$

where S is the pressure altitude, $K_1=44.342$ [km], $K_2=0.190263$, $K_3=45.395$ [km], $K_4=14.605$ [km], $P_0=1013.25$ [mb], and $P_B=226.32$ [mb]. Since the barometric altitude determination is stable, it is typically used in a variety of mechanizations to aid (i.e., bound) the inertial vertical loop. The standard day model for the atmosphere utilizes several fixed values which were derived to represent the average atmospheric conditions over a broad range of possible atmospheric conditions. Atmospheric conditions encountered by an aircraft usually differ from these average conditions defined by the standard day model, resulting in large inertial altitude and velocity errors when measured pressure values are simply inserted into the standard day model. Thus, the pressure altitude estimated from the standard day model and true altitude can differ significantly.

Differences between the calculated pressure altitude and true altitude are a result of the pressure altitude being based on the standard atmosphere, whereas atmospheric conditions encountered by an aircraft are usually nonstandard. A more accurate estimate for altitude can be obtained by accounting for nonstandard atmospheric conditions. One technique, known as the Blanchard altitude, was developed to compute a reference altitude based on a dynamic mathematical model of the nonstandard atmosphere rather than the assumed standard atmosphere model. The Blanchard altitude is a dynamically corrected altitude reference computed by numerically integrating the physical relationship between temperature, pressure, and altitude, where the Blanchard altitude (Z) is defined by the following equation:

$$Z = -\int \frac{KT}{gP} dP, \text{ where } K = \frac{R^*}{M}$$

where $R^*$ is the universal gas constant, M is an approximation for the molecular weight of air, g is the acceleration due to gravity, T is the temperature, and P is the pressure. The calculation of the Blanchard altitude is described in an article "A New Algorithm for Computing Inertial Altitude and Vertical Velocity," by R. L. Blanchard, published in IEEE Trans. on Aerospace and Electronic Systems, Vol. AES-7, No. 6, November 1971. The disclosure of this article is hereby incorporated by reference into the present application.

The relationship set forth in the Blanchard altitude equation is only valid in a region of air having a consistent relationship between pressure and altitude as well as temperature and altitude. The Blanchard altitude calculation assumes a frozen atmosphere having a constant density of air. However, an aircraft will encounter separate regions of air possessing different respective atmospheric conditions during its flight path. The Blanchard altitude calculation does not account for changes in atmospheric conditions between different regions of air. Thus, assumptions made about the atmospheric conditions in one region of air will not necessarily apply to atmospheric conditions in other regions of air, which could cause substantial differences between the estimated Blanchard altitude and the true altitude of the aircraft. Furthermore, since the Blanchard altitude is calculated using an integration of the physical relationship between temperature, pressure, and altitude, the Blanchard altitude is typically computed numerically by summing estimates of the change in altitude over time as computed using this physical relationship. Thus, any errors in the temperature or pressure measurements are summed into the Blanchard altitude estimation, and these errors will always remain present in the Blanchard altitude estimation and build upon one another in all future altitude estimations. These erroneous measurements can be another cause of differences between the estimated Blanchard altitude and the true altitude of the aircraft.

Thus, there is clearly a need for a system and method for more accurately measuring altitude in inertial navigation systems which accounts for changes in atmospheric conditions encountered during various stages of the flight path of an aircraft. Furthermore, there is a need for a system and method for more accurately measuring altitude in an inertial navigation system which limits the effects of erroneous measurements used in calculating altitude estimations.

SUMMARY OF THE INVENTION

The present invention provides a system and method for improving the accuracy of altitude determinations in an inertial navigation system. The system utilizes pressure measurements available to the inertial navigation system to initially calculate an estimated pressure altitude using the standard day model for the atmosphere. Temperature measurements are further utilized in the physical relationship between temperature, pressure, and altitude to compute a second computed altitude. A change between subsequent second computed altitudes is determined and compared with a respective change in subsequent computed pressure altitudes in order to generate a correction value. The correction value is then used to modify the computed pressure altitude to generate a more accurate determination of the absolute altitude of the inertial navigation system.

The correction value accounts for changes in atmospheric conditions which may be encountered by an aircraft when traveling through regions of air having different respective atmospheric conditions. The correction value is decayed over a predetermined period and updated with temperature and pressure measurements from a present region of air to prevent prior temperature and pressure measurements from a previously traveled through region of air from effecting the present altitude determination. Further, by decaying the correction value, the effects of erroneous temperature and pressure measurements are prevented from being included in all subsequent altitude determinations. Thus, the system and method of the present invention provides an absolute altitude determination having improved stability and improved accuracy over prior systems.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method of improving the accuracy of pressure altitude determinations in an inertial navigation system.

In order to provide an accurate estimation of altitude using external references available to inertial navigation systems in an aircraft, the physical relationship between pressure, temperature and altitude can be utilized to compute an accurate estimation of altitude from pressure and temperature measurements. Prior inertial navigation systems have utilized this physical relationship but have failed to account for changes in atmospheric conditions when computing altitude from external references, often resulting in inaccurate altitude estimations in the short term as well as accumulating aggregate errors over time. The present invention is directed toward improving the accuracy of altitude estimations by accounting for changes in atmospheric conditions as well as limiting the long term effects of past erroneous measurements.

Figure 1:
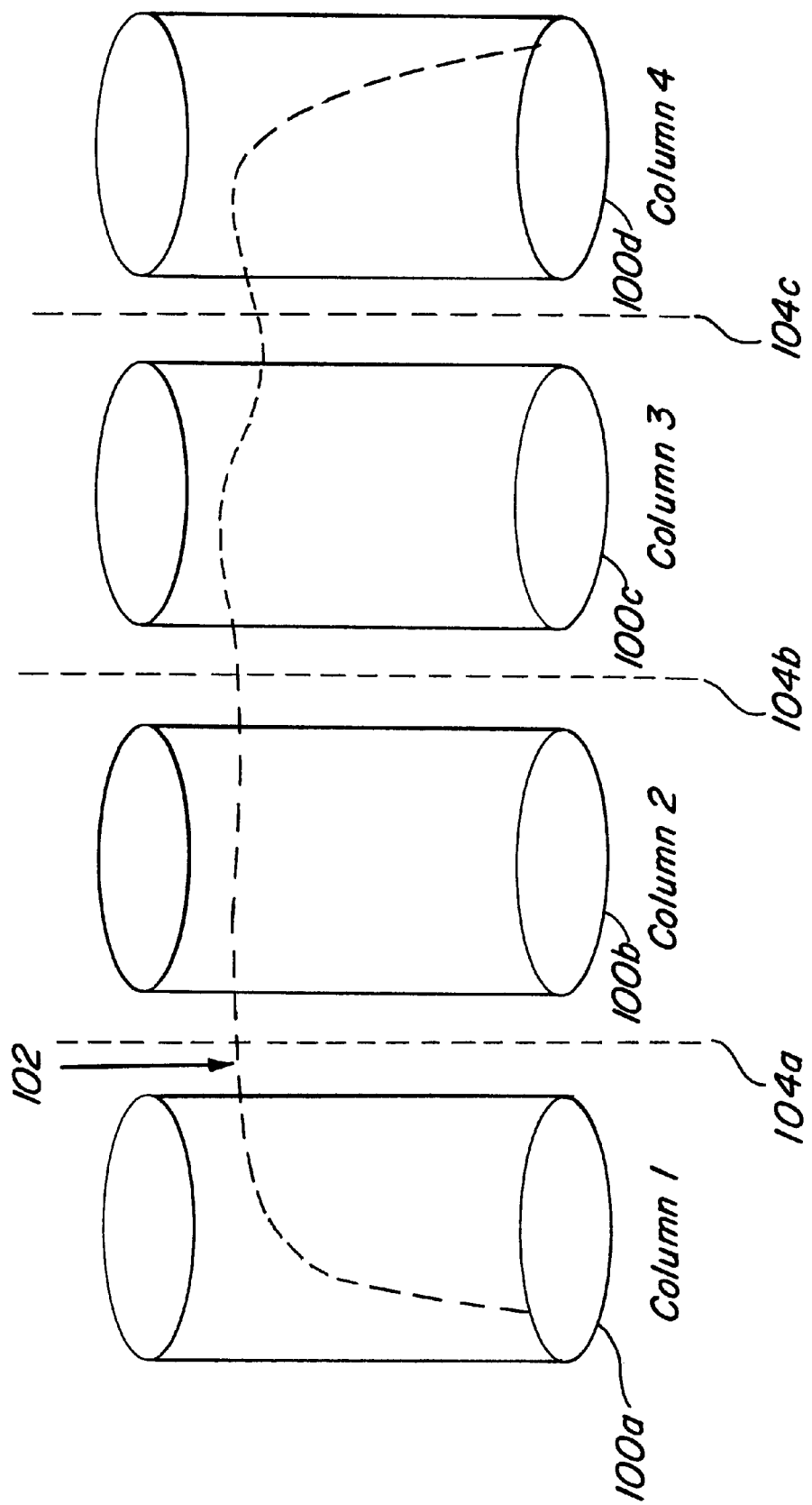
FIG. 1 is a simplistic perspective view of the flight path of an aircraft traveling through several different regions of air.

Referring now to FIG. 1, a simplistic view of the flight path of an aircraft is shown traveling through several different regions of air 100*a*, 100*b*, 100*c*, and 100*d*, with the flight path being indicated by dashed line 102. Each region of air 100*a*–100*d* possesses its own respective atmospheric conditions which may differ from one region to the next. Atmospheric conditions can vary with changing weather conditions and altitude, where the physical relationship between altitude and pressure as well as altitude and temperature will vary with the different atmospheric conditions. Thus, the relationship of temperature and pressure to altitude will be different within each respective region of air 100*a*–100*d*. In order to account for changing atmospheric conditions, the present invention continuously re-initializes the relationship between altitude, pressure, and temperature during the determination of the altitude of the aircraft, such as at points 104*a*, 104*b*, and 104*c* located between the changing atmospheric conditions. The regions of air having different atmospheric conditions are shown as columns of air in FIG. 1, it is understood that these regions may comprise any shape, size, or location.

Figure 2:
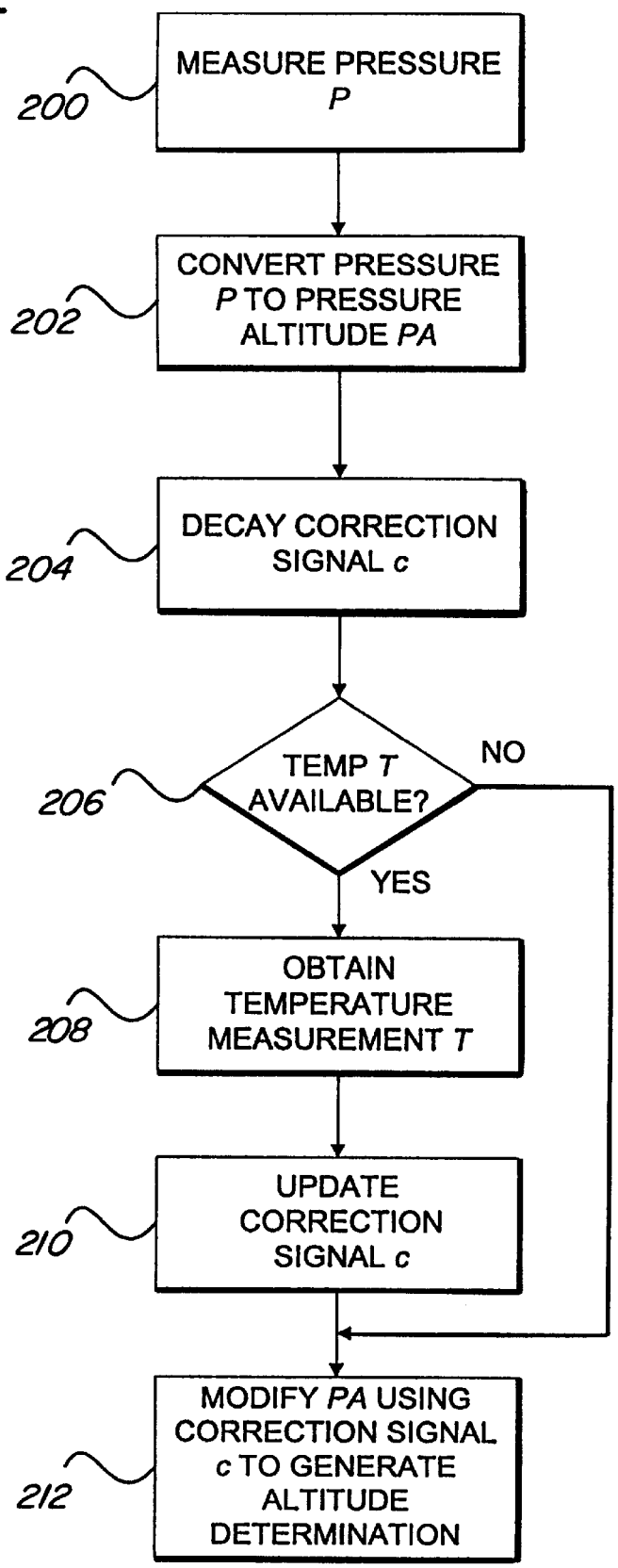
FIG. 2 is an operational block diagram of a preferred method of improving the accuracy of pressure altitude determinations in an inertial navigation system of the present invention.

Referring now to FIG. 2, an operational block diagram of a preferred method of improving the accuracy of altitude estimations in an inertial navigation system of the present invention is illustrated. Initially, the external references used to estimate the altitude are obtained. In step 200, a pressure measurement P is obtained. The pressure measurement P is then converted into a pressure altitude PA value using the standard day model for the atmosphere in step 202.

When a temperature measurement T is available, the present invention utilizes the physical relationship between temperature, pressure, and altitude to generate a second computed altitude, such as by using a Blanchard altitude estimation. The second computed altitude will be described hereinafter as a Blanchard altitude, but it is understood that any other altitude estimation which utilizes the physical relationship between pressure, temperature, and altitude can also be used as the second computed altitude.

Blanchard altitude is typically computed by summing estimates of the change in altitude over time. The present invention compares a change in the Blanchard altitude with a change in the pressure altitude PA to generate a correction value c, where the correction value c is used to modify the pressure altitude PA to obtain a more accurate determination of altitude. In order to account for changes in atmospheric conditions between different regions of air, the correction value c must be re-initialized for each region of air. In step 204, a previously calculated correction value c is decayed over a predetermined time period, so that measurements obtained from a prior region of air are gradually eliminated to minimize their effect on future altitude determinations. The generation of correction value c will be described in greater detail hereinafter with reference to a preferred mechanization of the present invention.

After decaying the correction value c, a determination is then made whether a temperature measurement T is also available in step 206. If a temperature a measurement T is not available, then the calculated pressure altitude PA is modified in step 212 using the decayed correction value c from step 204 to generate an altitude determination having an improved accuracy. Even more accurate results are achievable through the use of the temperature measurement T when available. If available, a temperature measurement T is obtained in step 208. The temperature measurement T and the pressure measurement P are used to compare a change in the Blanchard altitude with a change in the pressure altitude PA to update the correction value c in step 210. In step 212, the updated correction value c is then used to modify the pressure altitude PA obtained in step 202 to generate an altitude determination having an improved accuracy.

Figure 3:
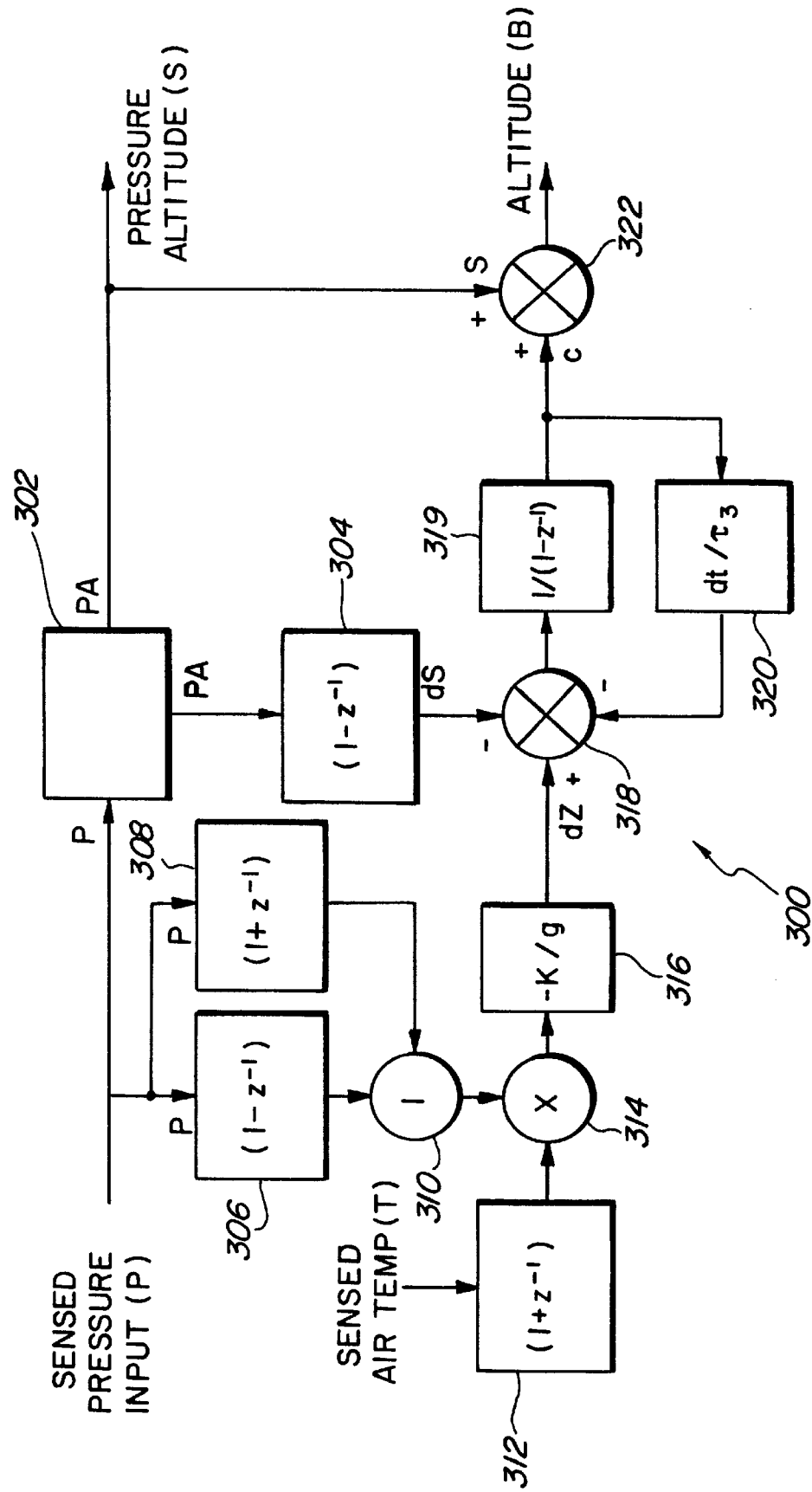
FIG. 3 is a block diagram of a preferred embodiment of the control system for improving the accuracy of pressure altitude determinations in an inertial navigation system of the present invention.

FIG. 3 illustrates a preferred embodiment of a control system 300 of the present invention for determining an estimated altitude as a function of the sensed pressure and sensed air temperature. The pressure and temperature are measured at a predetermined rate, which can be selected based upon the required operating characteristics of the control system 300. In order to account for existing time lags between the sensed temperature and pressure measurements, either the temperature measurements or the pressure measurements can be buffered by selecting an appropriate lag in a buffer for the characteristics of the particular sensors being used. A value for gravity is also required for the altitude determination, where the value of gravity can be supplied from a model, stored table, software, or any other source.

The sensed pressure P is input into conversion block 302 to convert the sensed pressure P into a value for pressure altitude PA using the standard day model for the atmosphere. The pressure altitude PA is output to a difference block 304 which determines the difference $dS_i$ in pressure altitude PA between successive pressure measurements, where:

$$dS_i = \begin{cases} \dfrac{K_1}{P_0^{K_2}}(P_{i-1}^{K_2} - P_i^{K_2}) : \ P > P_B \\ K_4 \log\left(\dfrac{P_{i-1}}{P_i}\right) : \ P < P_B \end{cases}$$

where $K_1=44.342$, $K_2=0.190263$, $K_4=14.605$, $P_0=1013.25$, $P_B=226.32$ [mb], $P_i$ is a current pressure measurement, and $P_{i-1}$ is a prior pressure measurement.

The sensed pressure P is also used in conjunction with the sensed air temperature T to determine a change in Blanchard altitude between measurements. To determine the change in Blanchard altitude, the sensed pressure P is input into difference block 306 and addition block 308. Difference block 306 computes the difference in pressure between successive pressure measurements P, while addition block 308 computes the sum of the same successive pressure measurements P. The output from difference block 306 is then divided by the output from addition block 308 by divisor 310. Temperature measurements T are taken concurrently with the pressure measurements P. The sensed temperature T is input into addition block 312 which computes the sum of the measured temperature T with its previously measured value. A multiplier 314 multiplies the output of addition block 312 with the output of divisor 310. The output of multiplier 314 is fed into gas constant and gravity block 316 where it is multiplied by the value $-K/g$. K is equal to the universal gas constant $R^*$ divided by an approximation for the molecular weight of air M, and g is a value for gravity. The output from block 316 yields the change in Blanchard altitude $dZ_i$ between successive temperature and pressure measurements, where:

$$dZ_i = -\dfrac{K}{g}\left[\dfrac{P_i - P_{i-1}}{P_i + P_{i-1}}\right](T_i + T_{i-1})$$

where $P_i$ is a current pressure measurement, $P_{i-1}$ is a prior pressure measurement, $T_i$ is a current temperature measurement, and $T_{i-1}$ is a prior temperature measurement.

The change in pressure altitude $dS_i$ is compared to the change in Blanchard altitude $dZ_i$ in summing device 318 to generate an error correction value $dS_i - dZ_i$, which is fed to integrator 319. Integrator 319 sums the error correction value $dS_i - dZ_i$ into an integrated correction value $c_i$, according to the equation:

$$c_i = c_{i-1} + dZ_i - dS_i$$

where $c_{i-1}$ is the previously calculated integrated correction value. In order to limit the effects from any integrated errors present from using the Blanchard altitude, the integrated error correction value $c_i$ is decayed in decay section 320 according to a predetermined time period. This allows the integral used for the calculation of the Blanchard altitude to be desensitized to changes in atmospheric conditions occurring between different regions of air. Decay section 320 may include a feedback term or other similar device for decaying the correction value $c_i$, so that the decayed correction value $c_i$ output from decay section 320 is, for example:

$$c_i = c_i - c_i \dfrac{dt}{\tau_3}$$

where $\tau_3$ is a correlation time of the filter determined as a compromise of expected flight scenarios, and dt is the filter sampling time.

The decayed correction value $c_i$ output from decay section 320 is added to the pressure altitude $S_i$ output from conversion block 302 in summing device 322 to produce the estimated altitude $B_i$:

$$B_i = S_i + c_i$$

In situations where a temperature measurement T is not available, it is not possible to calculate the difference in Blanchard altitude used in the calculation of the correction value $c_i$. The present invention does not calculate the error correction value $dS_i - dZ_i$ when temperature measurements T are not available, and thus prevents values for the change in pressure altitude $dS_i$ and the change in Blanchard altitude $dZ_i$ from being supplied to summing device 318. For instance, relay switches or other similar devices may be positioned after blocks 304 and 316 and before summing device 318, whereby the switches may be opened to break the connections between these components and prevent signals $dS_i$ and $dZ_i$ from reaching summing device 318. Thus, correction value $c_i$ is not updated with the values for the change in pressure altitude $dS_i$ and the change in Blanchard altitude $dZ_i$ and the previous value of the correction value $c_i$ is merely decayed. The decayed value of the prior correction value $c_i$ is used to modify the pressure altitude $S_i$ to generate the estimated altitude $B_i$ when temperature measurements T are not available.

The control system 300 of the present invention provides a more accurate absolute altitude measurement over prior methods of measuring altitude by applying a stable and accurate correction value to pressure altitude $S_i$. The control system 300 of the present invention may be implemented in hardware or by software in the inertial navigation system. The altitude determination produced by the method and system of the present invention is versatile in that it can be used to slave a variety of vertical loops, including the Ausman design, the five state Kalman design, and other mechanizations. The vertical loop requires tuning to match the slave altitude. For instance, in the case of the Blanchard altitude, the scale factor covariance is reduced while the barometer bias correlation time is adjusted accordingly. Furthermore, the method of determining the estimated altitude of the present invention reduces the apparent barometer scale factor error.

As can be seen from the foregoing, a system and method for improving the accuracy of altitude determinations in an inertial navigation system formed in accordance with the present invention is provided by accounting for changes in atmospheric conditions encountered during various stages of the flight path of an aircraft. Moreover, by forming a system and method for improving the accuracy of altitude determinations in an inertial navigation system in accordance with the present invention, a more accurate altitude determination can be achieved while limiting the lasting effects of erroneous measurements used in calculating the altitude determination.

In each of the above embodiments, the different structures of the system for improving the accuracy of altitude measurements in an inertial navigation system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. For instance, the teachings of the present invention are not intended to be limited to inertial navigation systems, where the teachings of the present invention can be extended to other applications which utilize pressure and temperature to generate an altitude determination. Furthermore, the second computed altitude can be computed by any method of determining altitude from temperature and pressure measurements, and it is not the intention of the inventors of the present invention to limit the second computed altitude to Blanchard altitude estimations. Therefore, it is to be understood that, within the scope of the appended claims, the invention may be practiced other than as specifically described herein.

What is claimed is:

1. A method of determining an altitude using external reference measurements, comprising the steps of:
   receiving pressure and temperature measurements;
   computing a pressure altitude value and a change in pressure altitude from the received pressure measurements;
   computing a change in a second computed altitude from the received temperature or pressure measurements;
   comparing the change in pressure altitude with the change in the second computed altitude to compute a correction value; and
   modifying the pressure altitude value with the correction value to produce an altitude determination.

2. The method of claim 1, further comprising the step of decaying the correction value over a predetermined time period prior to modifying the pressure altitude value.

3. The method of claim 2, further comprising the step of updating the values used to compute the correction value prior to modifying the pressure altitude value when temperature measurements are available.

4. The method of claim 1, wherein the change in the second computed altitude is computing according to the following equation:

$$dZ_i = -\frac{K}{g}\left[\frac{P_i - P_{i-1}}{P_i + P_{i-1}}\right](T_i + T_{i-1})$$

where K is a gas constant, g is a value for gravity, $P_i$ is a current pressure measurement, $P_{i-1}$ is a prior pressure measurement, $T_i$ is a current temperature measurement, and $T_{i-1}$ is a prior temperature measurement.

5. The method of claim 4, wherein the change in pressure altitude is computed according to the following equation:

$$dS_i = \begin{cases} \frac{K_1}{P_0^{K_2}}(P_{i-1}^{K_2} - P_i^{K_2}); & P > P_B \\ K_4 \log\left(\frac{P_{i-1}}{P_i}\right); & P < P_B \end{cases}$$

where $K_1$=44.342, $K_2$=0.190263, $K_4$=14.605, $P_0$=1013.25, $P_B$=226.32 [mb], $P_i$ is a current pressure measurement, and $P_{i-1}$ is a prior pressure measurement.

6. The method of claim 5, wherein the correction value is updated according to the following equation:

$$c_i = c_{i-1} + dZ_i - dS_i$$

where $c_i$ is the current correction value, $c_{i-1}$ is the prior calculation of the correction value, $dZ_i$ is the change in the second computed altitude, and $dS_i$ is the change in the pressure altitude.

7. The method of claim 6, wherein the correction value is decayed using a filter according to the following equation:

$$c_i = c_i - c_i\frac{dt}{\tau_3}$$

where dt is the sampling time of the filter and $\tau_3$ is the correlation time of the filter.

8. The method of claim 7, wherein the altitude determination is computed according to the following equation:

$$B_i = S_i + c_i$$

where $B_i$ is the altitude determination, $S_i$ is the current calculated barometric altitude, and $c_i$ is the decayed and updated correction value.

9. The method of claim 8, wherein the computed correction value $c_i$ is not updated when temperature measurements are not available.

10. A method of determining an altitude using temperature and pressure measurements, comprising the steps of:
    computing an estimated pressure altitude from a measured pressure value;
    computing a correction value from measured pressure and temperature values according to a physical relationship between pressure, temperature, and altitude;
    decaying the correction value over a predetermined time period; and
    modifying the estimated pressure altitude using the decayed correction value to produce a corrected pressure altitude determination.

11. The method of claim 10, further comprising the step of updating the computed correction value prior to modifying the pressure altitude value only when temperature measurements are available.

12. The method of claim 10, wherein the correction value computing step includes the steps of:
calculating a change in a second computed altitude from received temperature or pressure measurements;
computing a change in pressure altitude from received pressure measurements; and
comparing the change in pressure altitude with the change in the second computed altitude to produce the computed correction value.

13. The method of claim 12, wherein the change in the second computed altitude is computing according to the following equation:

$$dZ_i = -\frac{K}{g}\left[\frac{P_i - P_{i-1}}{P_i + P_{i-1}}\right](T_i + T_{i-1})$$

where K is a gas constant, g is a gravity value, $P_i$ is a current pressure measurement, $P_{i-1}$ is a prior pressure measurement, $T_i$ is a current temperature measurement, and $T_{i-1}$ is a prior temperature measurement.

14. The method of claim 13, wherein the change in pressure altitude is computed according to the following equation:

$$dS_i = \begin{cases} \frac{K_1}{P_0^{K_2}}(P_{i-1}^{K_2} - P_i^{K_2}): & P > P_B \\ K_4 \log\left(\frac{P_{i-1}}{P_i}\right): & P < P_B \end{cases}$$

where $K_1 = 44.342$, $K_2 = 0.190263$, $K_4 = 14.605$, $P_0 = 1013.25$, $P_B = 226.32$ [mb], $P_i$ is a current pressure measurement, and $P_{i-1}$ is a prior pressure measurement.

15. The method of claim 14, wherein the correction value is updated according to the following equation:

$c_i = c_{i-1} + dZ_i - dS_i$ where $c_i$ is the current correction value, $c_{i-1}$ is the prior calculation of the correction value, $dZ_i$ is the change in the second computed altitude, and $dS_i$ is the change in the pressure altitude.

16. The method of claim 15, wherein the correction value is decayed using a filter according to the following equation:

$$c_i = c_i - c_i \frac{dt}{\tau_3}$$

where dt is the sampling time of the filter and $\tau_3$ is the correlation time of the filter.

17. The method of claim 16, wherein the corrected pressure altitude determination is computed according to the following equation:

$B_i = S_i + c_i$ where $B_i$ is the corrected pressure altitude determination, $S_i$ is the current calculated pressure altitude, and $c_i$ is the correction value.

18. A system for determining an altitude using external reference measurements, comprising:
a pressure altitude conversion device for converting a received pressure measurement into a pressure altitude value;
a pressure altitude differencing device which receives the pressure altitude value and computes a change between the pressure altitude value and a prior pressure altitude value;
a second altitude estimation device for computed a second altitude from received pressure and temperature measurements and further calculating a change between the second computed altitude and a prior calculation of the second computed altitude;
a correction value generating device for generating a correction value based upon a comparison between the change the pressure altitude and the change in the second computed altitude; and
an altitude determining device for modifying the pressure altitude value using the correction value to generate an altitude determination.

19. The system of claim 18, further comprising a filter positioned between the correction value generating device and the altitude determining device for decaying the correction value over a predetermined time period and updating the values used to compute the correction value.

20. The system of claim 19, wherein the second altitude estimation device computes the second computed altitude from the pressure and temperature measurements; the second altitude estimation device further computing the change in the second computed altitude according to the following equation:

$$dZ_i = -\frac{K}{g}\left[\frac{P_i - P_{i-1}}{P_i + P_{i-1}}\right](T_i + T_{i-1})$$

where K is a gas constant, g is a value for gravity, $P_i$ is a current pressure measurement, $P_{i-1}$ is a prior pressure measurement, $T_i$ is a current temperature measurement, and $T_{i-1}$ is a prior temperature measurement.

21. The system of claim 20, wherein the pressure altitude differencing device computes the change in pressure altitude according to the following equation:

$$dS_i = \begin{cases} \frac{K_1}{P_0^{K_2}}(P_{i-1}^{K_2} - P_i^{K_2}): & P > P_B \\ K_4 \log\left(\frac{P_{i-1}}{P_i}\right): & P < P_B \end{cases}$$

where $K_1 = 44.342$, $K_2 = 0.190263$, $K_4 = 14.605$, $P_0 = 1013.25$, $P_B = 226.32$ [mb], $P_i$ is a current pressure measurement, and $P_{i-1}$ is a prior pressure measurement.

22. The system of claim 21, wherein the correction value generating device updates the correction value according to the following equation:

$c_i = c_{i-1} + dZ_i - dS_i$ where $c_{i-1}$ is the current correction value, $c_{i-1}$ is the prior calculation of the correction value, $dZ_i$ is the change in Blanchard altitude, and $dS_i$ is the change in pressure altitude.

23. The system of claim 22, wherein the filter decays the correction value according to the following equation:

$$c_i = c_i - c_i \frac{dt}{\tau_3}$$

where dt is the sampling time of the filter and $\tau_3$ is the correlation time of the filter.

24. The system of claim 23, wherein the altitude determining device computes the altitude determination according to the following equation:

$$B_i = S_i + c_i$$

where $B_i$ is the altitude determination, $S_i$ is the current calculated barometric altitude, and $c_i$ is the correction value.

* * * * *